United States Patent [19]
Senne

[11] Patent Number: 6,055,856
[45] Date of Patent: May 2, 2000

[54] PROCESS AND APPARATUS FOR TESTING INSULATION COVERAGE

[75] Inventor: David Henry Senne, Kansas City, Mo.

[73] Assignee: CertainTeed Corporation, Valley Forge, Pa.

[21] Appl. No.: 09/357,900

[22] Filed: Jul. 21, 1999

[51] Int. Cl.[7] ................................................ G01F 23/00
[52] U.S. Cl. .............................................................. 73/149
[58] Field of Search ............................ 73/32 R, 149; 33/1 V; 356/379, 380

[56] References Cited

U.S. PATENT DOCUMENTS

| | | | |
|---|---|---|---|
| 4,506,541 | 3/1985 | Cunningham | 73/32 R |
| 4,525,315 | 6/1985 | Greten | 73/32 R |
| 5,331,118 | 7/1994 | Jensen | 33/1 V |
| 5,847,273 | 12/1998 | Zubragel | 73/149 |

*Primary Examiner*—Robert Raevis
*Attorney, Agent, or Firm*—Paul & Paul

[57] ABSTRACT

Apparatus and method are provided for testing the volume of insulation coverage by blowing a fixed weight amount of insulation onto a moveable conveyor having a fixed lateral dimension and a predetermined height preferably measured by a photo cell. A longitudinal measurement of the longitudinal dimension of insulation on a moveable conveyor may be automatically measured by a linear encoder.

14 Claims, 4 Drawing Sheets ive ends of the conveyor 30,
PROCESS AND APPARATUS FOR TESTING INSULATION COVERAGE

BACKGROUND OF THE INVENTION

In the past, as blowing insulation is produced, most particularly fiberglass insulation, steps are taken to ascertain the coverage for a known quantity of insulation. The coverage consists of determining the volume that is occupied by a fixed amount, for example fifty pounds of fiberglass insulation.

In ascertaining such coverage, at each work shift in the production of insulation, a given amount of fiberglass insulation is blown between a pair of boards that are spaced apart and vertically disposed to simulate the attic space of a house between adjacent rafters. The insulation is thus blown into a volume that is fixed in lateral dimension and fixed in horizontal or longitudinal direction. The operator then determines the average height of the insulation between such boards, over the longitudinal length, averaging the high and low points to come up with an average vertical number which, together with the known width and length, can determine the volume that the known fifty pounds of fiberglass insulation will occupy. If adjustments are needed to increase the volume of a given amount of insulation, such can be done by adjusting the cutting, the treatment, or other mechanical features of the insulation. In the alternative, if the volume per fifty pound amount of insulation is too large, the insulation particle size can be reduced accordingly to effect a reduction in volume per weight.

The above-described system can result in considerable variation in correlating the volume of insulation with the weight of insulation, because the entire inspection is predicated upon averaging a visual estimate done by an individual. Because individuals will vary from shift-to-shift, the volume per weight of insulation delivered to a customer can sometimes have undesirable variation.

SUMMARY OF THE INVENTION

The present invention is directed toward regularizing the test relationship between volume and weight of blowing insulation by mechanizing the testing of the volume of insulation relative to its weight.

In accordance with the present invention, a fixed weight of insulation is blown into a receiving zone having a fixed lateral dimension by spaced-apart walls. A sensor measures the height build-up of insulation between the walls and a rake evens off the insulation height. The sensor actuates a conveyor drive for driving the conveyor longitudinally, with insulation then being blown onto the uncovered portion of the conveyor, until insulation in that portion of the conveyor is sensed as again reaching the predetermined, established height, whereupon the sensor again actuates a drive for the conveyor. The process continues in this manner until the entire pre-set amount by weight of insulation, often fifty pounds, has been blown onto the conveyor. Preferably, a short blast of air "squares off" the trailing end of insulation on the conveyor. A linear encoder measures the horizontal movement of the conveyor, to determine the longitudinal or horizontal length of the insulation that has been blown from the commencement of blowing the fixed weight of insulation onto the conveyor, until the completion of the same. Such horizontal or longitudinal measurement then allows a quick determination of the volumetric measure of coverage of the fixed weight of insulation, in that the height, length and width of the volume of insulation are known.

After such measuring has been completed, a vacuum withdrawal of insulation from the receiving zone on the conveyor allows for a withdrawal and return of insulation back into the production line.

Accordingly, it is a primary object of this invention to provide a novel apparatus for testing the volume of insulation coverage.

It is another object of this invention to provide a novel method of testing the volume of insulation coverage.

Other objects of the present invention will become readily apparent upon a reading of the following brief descriptions of the drawing figures, the detailed descriptions of the preferred embodiments, and the appended claims.

BRIEF DESCRIPTIONS OF THE DRAWING FIGURES

DETAILED DESCRIPTIONS OF THE PREFERRED EMBODIMENTS

Figure 1:
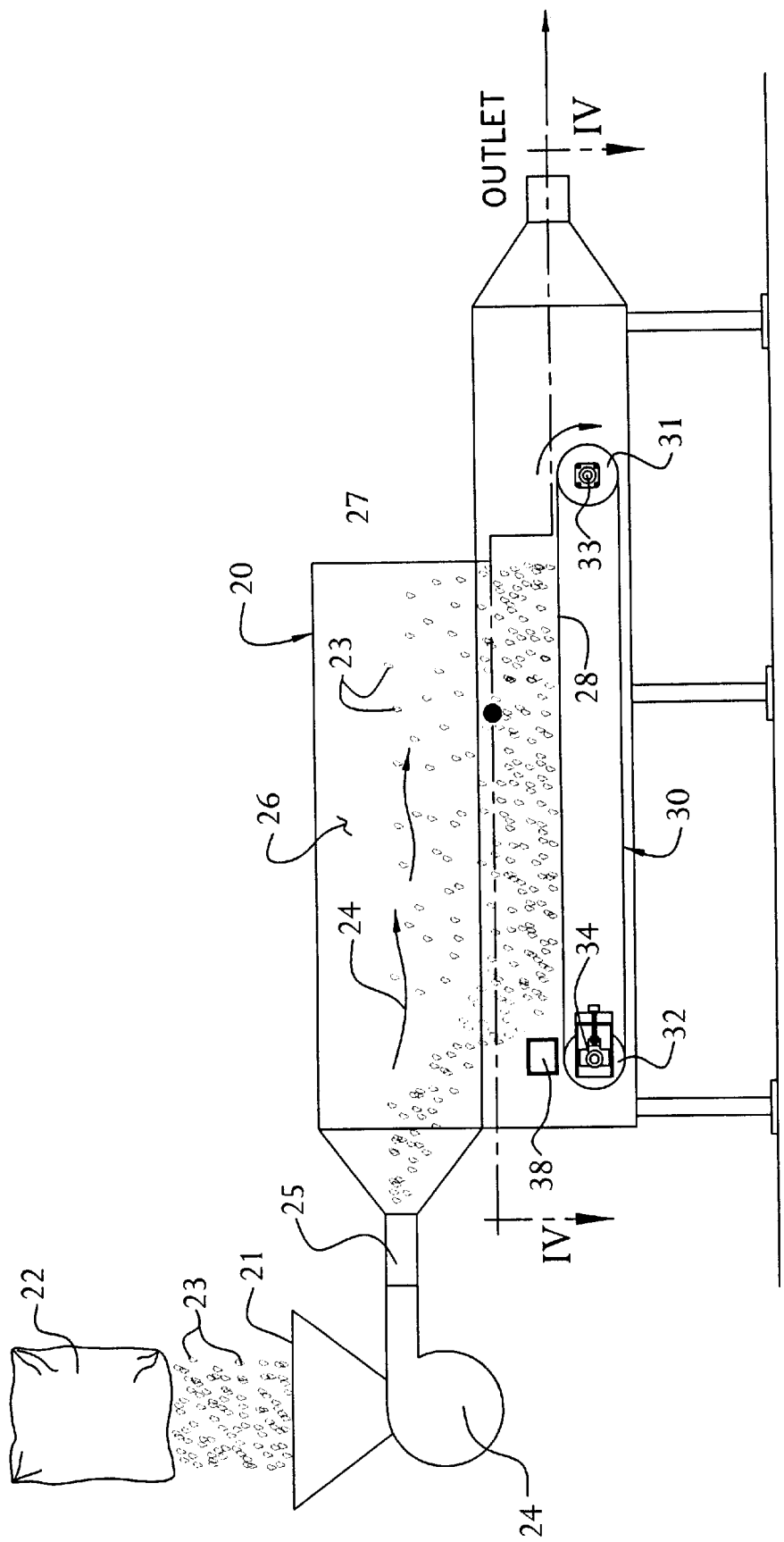
FIG. 1 is a schematic side view of apparatus for practicing the method of this invention, illustrating a bag of insulation being deposited into a hopper for blowing into an insulation receiving zone on a conveyor.

Referring to the drawings in detail, reference is first made to FIG. 1, wherein the apparatus for testing the volume of insulation corresponding to a known weight is illustrated at 20, comprising a hopper 21 for receiving insulation provided from a bag or other container 22, of known weight, such as fifty pounds, which insulation in the form of particles 23 enters the hopper 21, and is blown by means of a blower 24 or the like, into the inlet 25 of the receiving zone 26 for the apparatus, wherein the particles 23 are blown in the direction of the arrow 24, to strike against the far wall 27 of the receiving zone, and fall downwardly onto an upper run 28 of a belt conveyor 30 disposed therein.

Figure 4:
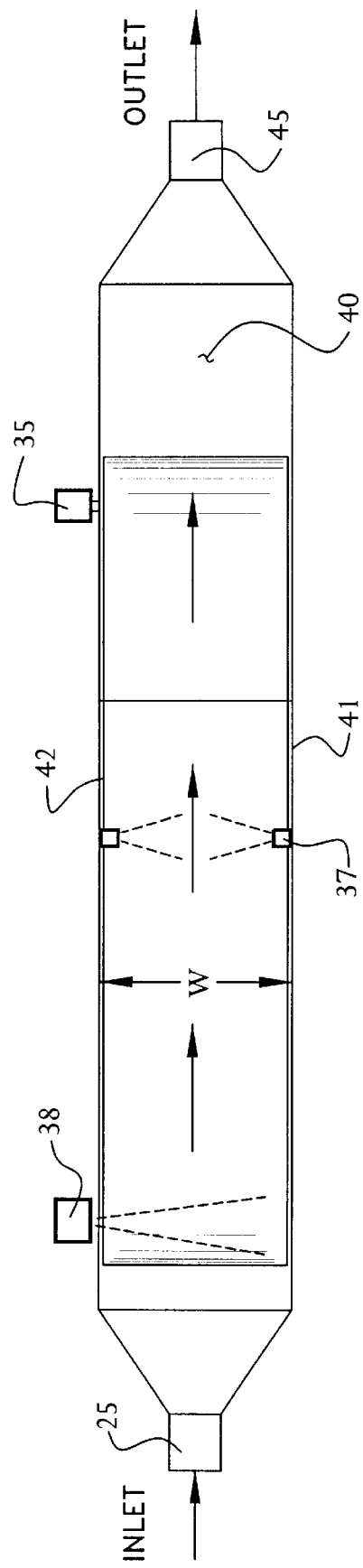
FIG. 4 is a horizontal sectional view taken generally along the line IV-IV of 5 FIG. 1.

The belt conveyor 30 is conventionally mounted on forward and rearward conveyor rollers 31 and 32, suitably journaled by a journal 33 and journal take-up mechanism 34 at respective forward and rearward ends of the conveyor 30, as shown. A suitable motor drive, preferably of the electric type, 35 (FIG. 4) is provided for driving the conveyor 30.

Figure 2:
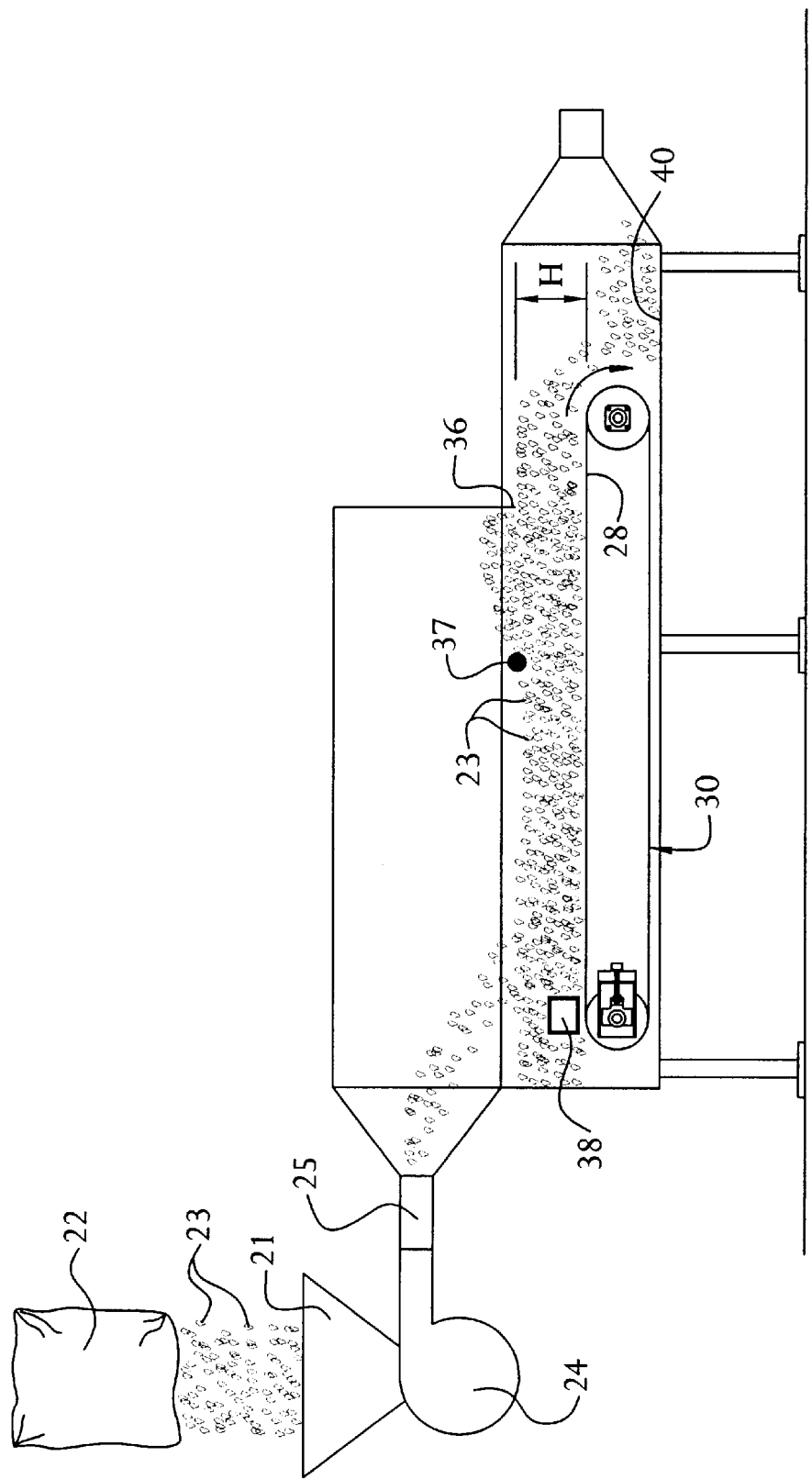
FIG. 2 is a view like that of FIG. 1, but wherein insulation is shown in built-up relationship on the conveyor, a distance H, as the conveyor moves under a rake of known height H.
Figure 3:
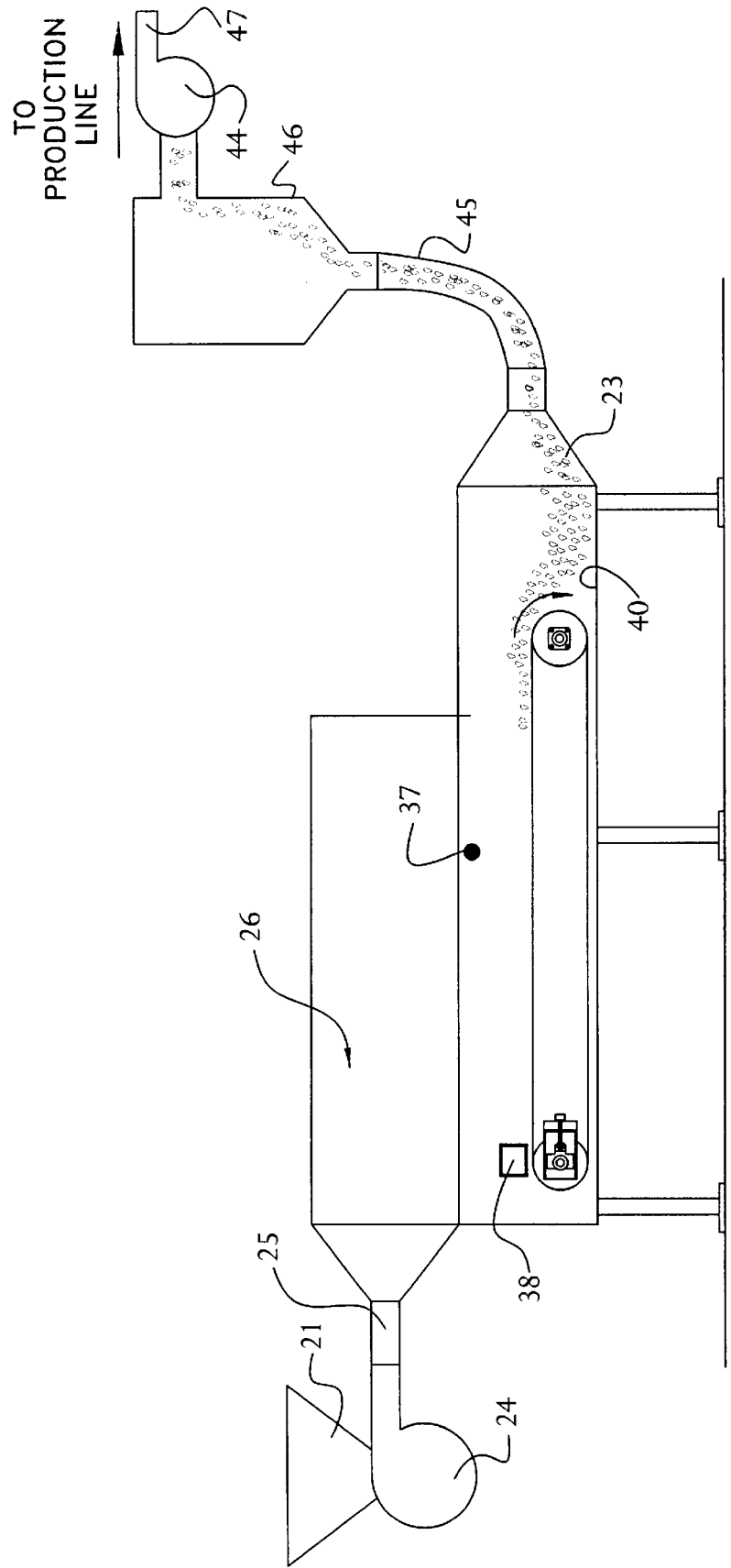
FIG. 3 is a view like that of FIGS. 1 and 2, but wherein there is also shown the vacuum withdrawal of insulation from a zone downstream of the conveyor, after the measure of volume has occurred for the fixed weight of insulation.

With reference to FIG. 2, it will be seen that the lower end 36 of the wall 27 provides a rake, for raking piled-up insulation particles on the upper run 28 of conveyor belt 30, such that the accumulation in a vertical direction H of piled-up insulation particles is evened out, limited to the height H above the upper run 28 of the conveyor, and below the lower edge of the rake 36 as shown. A photo-eye mechanism 37 determines the accumulated height H of insulation particles 23 on the upper run 28 of the conveyor 30, and the rake 36 assures the evenness of the height H of accumulated particles traveling past the lower end of the rake 36. The generally horizontal, or longitudinal movement of the upper run 28 of the conveyor 30 is measured by a linear encoder 38. Thus, the motor 35 driving the conveyor 30 will operate intermittently, as insulation particles 23 blown from the hopper 21 accumulate to the desired level H on the upper run 28 of the conveyor belt, at which point the conveyor belt is actuated to drop the particles onto the floor of the discharge zone 40, whereby new incoming insulation particles then accumulate on the upper run 28 of the belt, after the driving of the belt has been discontinued. The process continues in this manner until the entire known weight of insulation particles from the bag 22 have been deposited onto the upper run 28 of the conveyor 30. At the end of the process, as a bag 22 is emptied, a short blast of air delivered by the blower 24 will "square-up" the trailing end of the accumulation of insulation particles 23 on the conveyor 28 and the measurement of generally horizontal longitudinal length of insulation by the linear encoder thus provides the longitudinal dimension L for accumulated insulation. The height dimension H will preferably be fixed at a standard twelve inches, as will the width dimension W between vertically upstanding side walls 41 and 42. H×W×L=the volume of insulation from the bag 22.

After the known volume of insulation particles 23 from the bag 22 has been calculated in the manner described above, and the insulation particles have been dropped onto the floor 40, the drive 35 for the conveyor 30 will again be deactivated and a vacuum draw via a blower or the like 44 will be provided, drawing insulation particles 23 from the floor 40 of the discharge zone, up through an appropriate duct 45, into a discharge hopper or the like 46, to be returned via line 47 or the like to production.

It will thus be seen that the amount of insulation received within the volume of the receiving zone on the upper run of the conveyor, as measured by the fixed lateral dimension W, the sensed vertical accumulation H and the horizontal dimension L of insulation on the conveyor as determined by the linear encoder 38, will provide a volumetric measure of coverage of a fixed weight of insulation from the bag 22.

It will be apparent from the foregoing that various modifications may be made in the details of construction, as well as in the use and operation of the device and method of this invention, all within the scope of the invention as defined in the appended claims.

What is claimed is:

1. Apparatus for testing the volume of insulation coverage for a fixed weight of insulation particles, comprising:
   (a) means for receiving a fixed weight of insulation particles;
   (b) means for blowing the fixed weight of insulation particles into a receiving zone;
   (c) a receiving zone of fixed lateral dimension comprising laterally spaced apart generally vertical walls and a generally horizontal conveyor;
   (d) sensor means associated with at least one of said walls for sensing the vertical accumulation of insulation particles in said zone;
   (e) actuable drive means connected to said sensor means for driving said conveyor in a generally horizontal longitudinal direction upon actuation of the drive means in response to said sensor means; and
   (f) linear measuring means for measuring the generally longitudinal dimension of insulation particles on the conveyor;
whereby the amount of insulation received within the volume of the receiving zone, as measured by the fixed lateral dimension, the sensed vertical accumulation and the longitudinal dimension of insulation on the conveyor provide a volumetric measure of coverage for a fixed weight of insulation.

2. The apparatus of claim 1, wherein said conveyor comprises a movable conveyor belt.

3. The apparatus of claim 1, wherein said means for blowing includes means for directing an air blast to a trailing end of insulation particles in the receiving zone, to raise the trailing end of insulation particles in the receiving zone to approximately the height of the sensor means.

4. The apparatus of claim 1, wherein said linear measuring means comprises a linear encoder.

5. The apparatus of claim 1, including means for vacuum withdrawal of insulation particles from said receiving zone after measuring the longitudinal movement of the conveyor.

6. The apparatus of claim 1 including rake means for evenly raking the upper surface of accumulated insulation particles on the conveyor.

7. The apparatus of claim 1, wherein said conveyor comprises a movable conveyor belt, wherein said means for blowing includes means for directing an air blast to a trailing end of insulation particles in the receiving zone, to raise the trailing end of insulation particles in the receiving zone to approximately the height of the sensor means, wherein said linear measuring means comprises a linear encoder, including rake means for evenly raking the upper surface of accumulated insulation particles on the conveyor and means for vacuum withdrawal of insulation particles from said receiving zone after measuring the horizontal movement of the conveyor.

8. A method of testing the volume of insulation coverage for a fixed weight of insulation particles, comprising the steps of:
   (a) delivering a fixed weight of insulation particles to a blower;
   (b) blowing the fixed weight of insulation particles into a receiving zone;
   (c) providing the receiving zone to have a fixed lateral dimension between laterally spaced apart generally vertical walls, and a generally horizontal conveyor;
   (d) sensing the vertical accumulation of insulation in the receiving zone through at least one sensor;
   (e) driving the conveyor in a generally horizontal, longitudinal direction through a drive means, in response to a signal received by the sensor; and
   (f) measuring the generally longitudinal movement of the conveyor;
whereby the amount of insulation received within the volume of the receiving zone, as measured between the fixed walls, the sensed vertical accumulation and the longitudinal dimension of insulation particles on the conveyor, to provide a volumetric measurement of coverage of a fixed weight of insulation.

9. The method of claim 8, wherein the driving of the conveyor includes driving a movable conveyor belt.

10. The method of claim 8, wherein the blowing step includes directing an air blast to a trailing end of insulation particles in the receiving zone to raise the trailing end of insulation particles in the receiving zone to approximately the height of the sensor.

11. The method of claim 8, wherein the measuring step includes using a linear encoder to measure the longitudinal movement of the conveyor.

12. The method of claim 8, including the step of vacuum withdrawal of insulation particles from the receiving zone after measuring the longitudinal movement of the conveyor.

13. The method of claim 8, including the step of raking the upper surface of accumulated insulation on the conveyor to even it out.

14. The method of claim 8, wherein the driving of the conveyor includes driving a movable conveyor belt, wherein the blowing step includes directing an air blast to a trailing end of insulation particles in the receiving zone to raise the trailing end of insulation particles in the receiving zone to approximately the height of the sensor, wherein the measuring step includes using a linear encoder to measure the longitudinal movement of the conveyor, including the step of raking the upper surface of accumulated insulation on the conveyor to even it out and including the step of vacuum withdrawal of insulation particles from the receiving zone after measuring the longitudinal movement of the conveyor.

* * * * *